United States Patent [19]

Van Deventer

[11] Patent Number: 5,886,801
[45] Date of Patent: Mar. 23, 1999

[54] COUPLING ARRANGEMENT FOR COUPLING OPTICAL CONNECTIONS

[75] Inventor: Mattijs Oskar Van Deventer, Leidschendam, Netherlands

[73] Assignee: Koninklijke KPN N.V., Groningen, Netherlands

[21] Appl. No.: 719,389

[22] Filed: Sep. 24, 1996

[30] Foreign Application Priority Data

Oct. 18, 1995 [NL] Netherlands .......................... 1001441

[51] Int. Cl.$^6$ ................................................ H04J 14/02
[52] U.S. Cl. ........................ 359/119; 359/110; 359/117; 359/118; 359/125; 359/128; 359/166; 385/16; 385/24
[58] Field of Search .................... 259/110, 118, 259/119, 125, 128, 166, 117; 385/16, 24

[56] References Cited

U.S. PATENT DOCUMENTS

| 4,897,830 | 1/1990 | Hill et al. | 359/124 |
| 5,194,977 | 3/1993 | Nishio | 359/128 |
| 5,208,692 | 5/1993 | McMahon | 359/128 |
| 5,442,623 | 8/1995 | Wu | 359/118 |
| 5,647,035 | 7/1997 | Cadeddu et al. | 359/119 |
| 5,751,454 | 5/1998 | MacDonald et al. | 359/119 |
| 5,760,934 | 6/1998 | Sutter et al. | 359/124 |
| 5,760,936 | 6/1998 | Shirai | 359/128 |

FOREIGN PATENT DOCUMENTS 0 674 404 A1  9/1995  European Pat. Off. .

WO 93/00756  1/1993  WIPO .

OTHER PUBLICATIONS

Patent Abstracts of Japan; vol. 9, No. 274; Oct. 1931, 1995; Japanese A,60 117850 (Fujitsu).

T.H. Wu; "Broadband Broadcast Sonar SHR Architecture"; 1992; Fiber Network Service Survivability; Artech House, Boston, Mass.; pp. 195–201.

B. Chen et al; "Optical Communications"; Dec. 16–18, 1992; pp. 12–22; vol. 1817; SPIE—The International Society for Optical Engineering.

*Primary Examiner*—Edward Lefkowitz
*Attorney, Agent, or Firm*—Frishauf, Holtz, Goodman, Langer & Chick

[57] ABSTRACT

In a ring-shaped optical distributive network, provided with a central node and a number (N) of network nodes, distribution signals DS are transmitted in two signal transport directions (F, B) by the central node. For the execution of a drop-and-continue function (DC function), each network node comprises a coupling arrangement (21) provided with an optical 2×2 switch (28) and a tapping device (33). The switch and the tapping device are mutually coupled in such a way that the DC function can be carried out in a switchable manner in only one of both signal transport directions simultaneously. The switch (28) is turned over when distribution signals from a signal transport direction in a related network node are no longer received. Such a network is self-healing for a single network failure.

20 Claims, 4 Drawing Sheets

COUPLING ARRANGEMENT FOR COUPLING OPTICAL CONNECTIONS

BACKGROUND OF THE INVENTION

The invention relates to a coupling arrangement for coupling a first and a second optical connection, said coupling arrangement comprising a first optical point of connection for coupling the first optical connection, a second optical point of connection for coupling the second optical connection, and a third point of connection, the coupling arrangement further comprising a first device which is situated between the first and the second point of connection, provided with a first sub-point of connection which can be coupled to the first point of connection, a second sub-point of connection which can be coupled to the second point of connection, and a third and a fourth sub-point of connection for coupling to a second device, and the second device, which is coupled to the third and fourth sub-point of connection, said second device being provided with an output which is coupled to the third point of connection.

Such a coupling arrangement is employed in a node of an optical video transport and distribution system as described in M. Yamashita and T. Tsuchiya, "Optical video transport/distribution system with video on demand service", SPIE Vol. 1817 Optical Communications (1992), pp. 12–22 (referred to hereinafter as "Yamashita and Tsuchiya"). This system comprises a distributive network in which a number of network nodes are included in a single optical fibre connection, while a main node is connected to the ends of the optical fibre connection via an optical power splitter, so that a ring-shaped network is formed. The fibre connection is used bi-directionally. In the main node the signals to be distributed, hereinafter referred to as distribution signals, are transmitted as optical signals in both signal transport directions over the optical fibre connection via the optical power splitter. In each network node the distribution signals from both transport directions are amplified, and partly passed on in each of the two transport directions to a subsequent network node, and partly dropped and, via a uni-directional optical connection, further conducted to an optical network terminating unit (ONU) to which a number of subscriber lines are connected. For this drop-and-continue function, each network node is provided with a coupling arrangement of the above-mentioned kind. The coupling arrangement comprises a bi-directional optical amplifier (the first device), implemented as a quadruple port, with which the distribution signals from both signal transport directions are first amplified and are subsequently split into two signal parts in a power coupler. For each signal transport direction one signal part is subsequently transmitted further over the fibre connection in that signal transport direction, and the other (dropped) signal part is conducted to a separate input of two inputs of an optical switch (the second device). The switch, under the control of a control signal, passes the signal part which is presented to one of the two inputs of the switch on to downstream circuits via an output of the switch. The control signal is derived from distribution signals in both transport directions via an optical tapping point placed in the fibre connection at one side adjacent to the bi-directional amplifier in the network node. If the signal in a network node from one of both signal transport directions drops out, as is the case, for example, for a rupture in the fibre connection or on failure of a bi-directional amplifier in a network node elsewhere in the ring-shaped network, then the optical signal over the fibre connection from the other signal transport direction will still be received. This prior art distributive network is therefore self-healing, and the optical switch in the coupling arrangement in each network node has the function of a protective switch. However, this prior art technique has a major disadvantage. Bi-directional amplifiers are very sensitive for reflections and Rayleigh backscattering, so that only a small number of such amplifiers can be applied in a bi-directional fibre connection. This restricts the number of network nodes which can be included in the ring-shaped network and thus the total dimensioning of distributive networks considerably.

SUMMARY OF THE INVENTION

The object of the invention is to provide a coupling arrangement, in which only uni-directional amplification is applied and with which nevertheless a distributive network can be realised, which is based upon a number of network nodes, provided with such a coupling arrangement and included in a single fibre connection, and which is self-healing. A coupling arrangement of the above-mentioned kind according to the invention thereto is an arrangement, wherein the first device is an optical switch and the second device is a tapping device. Moreover the tapping device has been provided with an input which is coupled to the third sub-point of connection of the optical switch, and a further output which is coupled to the fourth sub-point of connection of the optical switch.

It is based on the insight that the drop-and-continue function, which in the prior art coupling arrangement is actually bi-directional and, specifically, is carried out prior to the switching function of the protective switch, need only be carried out uni-directionally, if it is interchanged with the protective switching function.

In a preferred embodiment of the coupling arrangement according to the invention, the optical switch is provided with a signal input for a control signal for switching the switch between a first position, hereinafter referred to as the bar-state, and a second position, hereinafter referred to as the cross-state, where in the bar-state the first sub-point of connection is interconnected with the third sub-point of connection, and the second sub-point of connection with the fourth sub-point of connection, and in the cross-state the first sub-point of connection is interconnected with the fourth sub-point of connection, and the second sub-point of connection with the third sub-point of connection. This means that the position of the optical switch determines the direction in which signals are conducted through the tapping device. In a following preferred embodiment of the coupling arrangement according to the invention the tapping device encloses:

an optical amplifier provided with an input and an output, and an optical power splitter provided with an input and a first and a second output, in which the input of the amplifier forms the input of the tapping device, the output of the amplifier is coupled to the input of the power splitter, the first output of the power splitter is coupled to the fourth sub-point of connection of the optical switch, and the second output of the power splitter is coupled to the third point of connection of the coupling arrangement. Since a uni-directional optical amplifier also possesses an isolating function, this means that, dependent upon the position of the switch, the coupling arrangement continually drops and passes on signals in one direction only, while signals in the opposite direction are blocked.

It is not necessary that the drop-and-continue function remains completely optical. In a further preferred embodiment of the coupling arrangement the tapping device encloses:

an optical receiver provided with a signal input and an electrical signal output, for receiving an optical signal at the signal input and delivering a corresponding electrical signal at the signal output, an optical transmitter provided with a signal input and a signal output, for receiving an electrical signal at the signal input and transmitting a corresponding optical signal at the signal output, in which the signal input of the optical receiver is coupled to the third sub-point of connection of the optical switch, the signal output of the receiver is coupled to the signal input of the optical receiver and to the third point of connection of the coupling arrangement, and the signal output of the optical transmitter is coupled to the fourth sub-point of connection of the optical switch. In an optical network, such a coupling arrangement can also function as an optical network terminating unit.

The invention is further related to a network for distributive transmission of distribution signals of a kind as known from Yamashita and Tsuchiya, in which network the coupling arrangement according to the invention is applied in at least one of the network nodes. In a preferred embodiment of the network, each network node is provided with the coupling arrangement according to the invention. Thereby the network is self-healing for at least each network node which is provided with the coupling arrangement according to the invention, without the network possessing the above-mentioned disadvantages.

The invention is further applicable in a distributive network in which the technique of dual homing is applied, that is to say, that each network node is accessible for the distribution signals, which are distributed by two separate, preferably geographically dispersed, central nodes. In such dual homing network at least one, but preferably all of the network nodes are provided with the coupling arrangement of the invention. Application of dual homing takes place to cope with failure of a central node.

In T. H. Wu, "Fiber Network Service Survivability", Artech House, Boston, 1992 (referred to hereinafter as "Wu") and in particular in Section 4.7 there of, "Broadband broadcast SONET SHR architecture", pp. 195–201, a so-called self-healing ring is described which is utilisable as a distributive optical network. From a central or main node, signals are transmitted in one direction over a transport ring, a so-called add/drop multiplexer (ADM) being used in each node of the ring in a position designated as "drop-and-continue". In this position of the ADM the signals which are selected (or are to be selected) by the node concerned are taken from the transport ring, and at the same time all signals are conducted further over the transport ring. In the event of a cable rupture between two successive nodes, the connection with the transport ring in the onward going direction is interrupted in each of those two nodes and is interconnected with a protective ring in the opposite direction. Thereby the signals which are received via the transport ring are further conducted in the opposite direction via the protective ring. In this solution, however, the network applied—the transport ring and the protection ring are formed by separate optical fibre connections—and the nodes included in it are more extensive and complex than is necessary for the actual functionality of the signal distribution.

The above mentioned publication by Yamashita and Tsuchiya and the above mentioned publication by Wu are deemed to be incorporated by reference in the present application.

BRIEF DESCRIPTION OF THE DRAWINGS

The invention will be further explained by means of a description of an exemplary embodiment, reference being made to a diagram which comprises the following figures.

DETAILED DESCRIPTION

Figure 1:
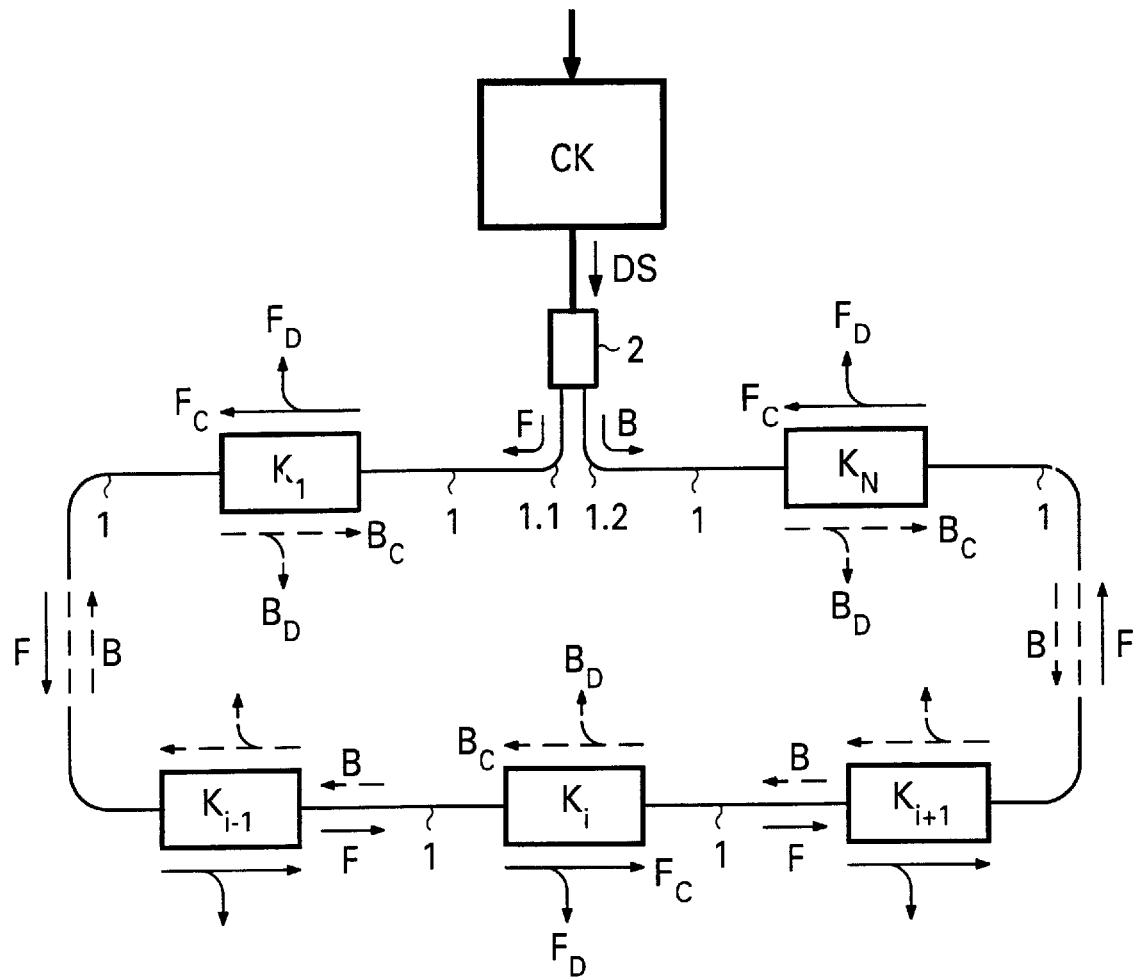
FIG. 1 diagrammatically shows a first configuration of a distributive network according to the invention.
Figure 2:
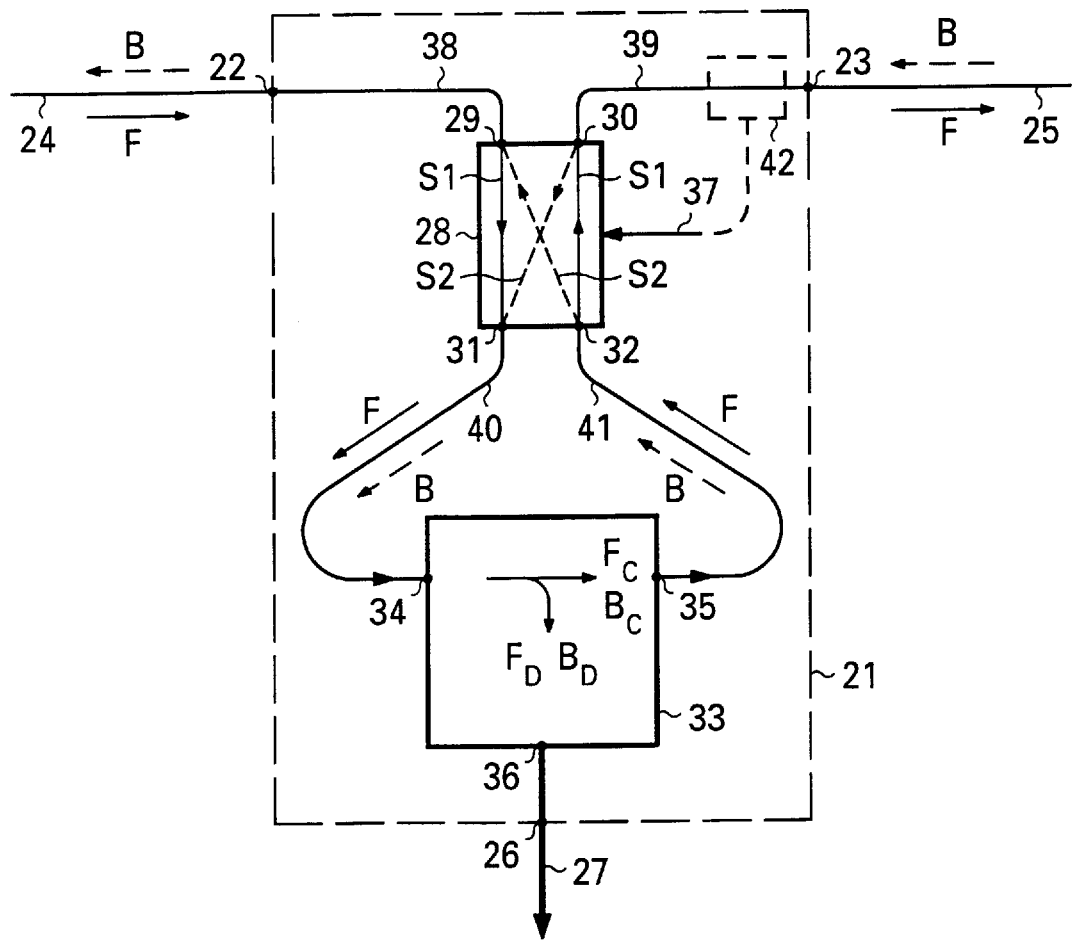
FIG. 2 shows a diagram of a coupling arrangement according to the invention.

In FIG. 1, a first configuration of an optical signal transport and signal distribution network according to the invention is diagrammatically shown. In the network, a central node CK is included which transmits the optical signals DS to be distributed across the network. The signals DS to be distributed, referred to as distribution signals DS for short, are for example cable TV signals and/or video signals which the central node receives via an antenna or cable system or which are generated in the central node itself (not shown). The network further comprises a row of N ($N \geq 2$) network nodes $K_1, K_2, \ldots, K_N$, which are successively included in an optical transmission line 1, such as an optical fibre connection. The central node CK is connected via an optical power splitter 2 to ends 1.1 and 1.2 of the optical transmission line 1. The central node CK transmits the distribution signals DS via the power splitter 2 over both ends 1.1 and 1.2 of the transmission line 1, in the direction of the first network node $K_1$ and the last network node $K_N$ respectively. Each network node $K_i$ (i=1,..., N) has a signal drop and a signal continue function, hereinafter referred to as DC function for short. This DC function is carried out in either a forward signal direction F or a backward signal direction B. The signals which are dropped are designated by arrows $F_D$ and $B_D$, while the signals which are continued are designated by arrows $F_C$ and $B_C$, in the forward and in the backward signal direction respectively. Since they are distribution signals, the continued signals ($F_C$ or $B_C$) contain the same information as the dropped signals ($F_D$ or $B_D$). From a network node, the dropped signals are for example further transmitted to an optical network terminating unit (not shown) and further distributed in electrical form over a number of subscribers connected to the network terminating unit (also not shown). Each network node consists of a coupling arrangement 21 which in FIG. 2 is shown in more detail. The coupling arrangement 21 is provided with a first optical point of connection 22 and with a second optical point of connection 23, which can either be coupled or are coupled to the different ends 24 and 25 of the optical transmission line 1 respectively. Via a third point of connection 26, the coupling arrangement can be coupled or is coupled to an outbound transmission connection 27. The coupling arrangement 21 is provided with an optical switch 28 with four ports 29, 30, 31 and 32, and with a tapping device 33 with an optical input port 34 and an optical first output port 35 and a second output port 36. The switch 28 is a "cross/bar" switch which, by means of a control signal which can be supplied to the switch 28 via a control line 37, is switchable between two positions S1 and S2. Position S1 is a "bar" position in which the ports 29 and 30 are optically interconnected with the ports 31 and 32 respectively, and position S2 is a "cross" position in which the ports 29 and 30 are interconnected with the ports 32 and 31 respectively. Optical connections 38 and 39 connect the first point of connection 22 and the second point of connection 23 respectively to the ports 29 and 30 of the switch 28. Optical connections 40 and 41 connect the ports 31 and 32 respectively to the input port 34 and the first output port 35 of the tapping device 33. The second output port 36 of the tapping device 33 is connected to the third point of connection 26 of the coupling arrangement 21. In a network node provided with such a coupling arrangement, the actual DC function is located in the tapping device. The tapping device is uni-directional, that is to say, that the DC function is carried out only on signals which are presented via the input port 34 of the tapping device 33, and that signals presented to the output ports 35 and 36 are blocked (and absorbed). By the specific combination of the switch and the uni-directional tapping device, the coupling arrangement is uni-directionally switchable. Thereby the DC function of the node is, at the same time, switchably reversible in direction. Thus the tapping device 33 carries out the DC function for distribution signals in the forward direction F, in a "bar" position S1 of the switch 28, and for distribution signals in the backward direction B in a "cross" position S2 of the switch 28. In uninterrupted operation, each network node carries out the DC function in a same signal transport direction, either in the forward direction F or in the backward direction B. In the forward direction F, the switches 28 of the network nodes $K_i$, (i=1, . . . , N) are in the "bar" position S1 as prevailing signal transport direction, and in the backward direction B in the "cross" position S2.

The switches can have been put in one of the two positions during an initialisation procedure of the network by means of control signals via the control lines 37 of the switches 28. The control signals can be generated centrally in the network. They are preferably, however, separately generated locally in each network node, for example by means of an optical tapping point 42, known per se (see Reference [1]), which is placed in the optical connection 39 in the coupling arrangement 21 of each network node $K_i$. Such an optical tapping point delivers a control signal as a result of an intensity measurement. A control signal which is dependent upon the difference between the signal intensities in each of both signal directions, measured in the optical connection in which the scanning point is placed, is common. The optical tapping point 42 can also be placed in the optical connection 38.

Figure 3:
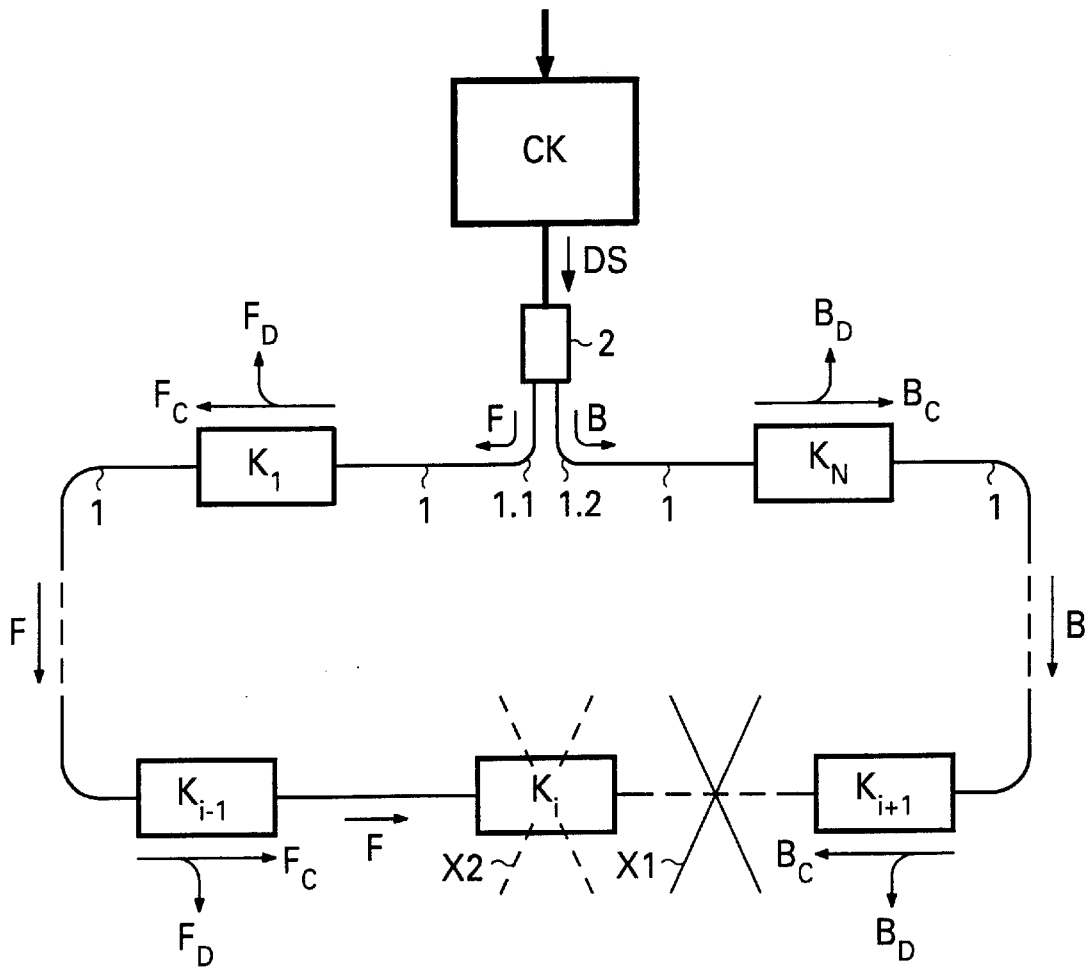
FIG. 3 diagrammatically shows the first configuration shown in FIG. 1 after self-healing in a situation of failure.

When the normal operation is interrupted, all network nodes beyond the place of the failure in the network, in the direction of the signal transport direction (F or B) prevailing until then, no longer receive distribution signals DS. Two of such cases of failure $X_1$ and $X_2$ are represented in FIG. 3 by means of a cross. Case of failure $X_1$ encompasses the falling out of the optical connection between two successive network nodes $K_i$ and $K_{i+1}$, while case of failure $X_2$ entails the falling out of a network node $K_i$, both at a prevailing signal transport direction in forward direction F. In each of both cases the network nodes $K_{i+1}, \ldots, K_N$, as of the moment the failure occurs, no longer receive distribution signals. As a result of this, a corresponding control signal is placed, in each of these network nodes, on the control line 37 of the optical switch 28 by the optical tapping point 42 of the coupling arrangement 21, as a result of which the switch is put in another position, in this case from the "bar" position S1 to the "cross" position S2. As a consequence each of the network nodes $K_{i+1}, \ldots, K_N$ will start carrying out the DC function in the direction B, direction B becoming the prevailing signal transport direction for these network nodes. The distribution signals DS which are transmitted from the power splitter 2 in the direction B are no longer blocked in the last node $K_N$ and, as a result of the changed direction of the DC function in the nodes $K_{i+1}, \ldots, K_N$, can reach these nodes again. The other functioning nodes ($K_1, \ldots, K_i$ in case of failure $X_1$, and $K_1, \ldots, K_{i-1}$ in case of failure $X_2$) have remained unalterably accessible for the distribution signals DS in forward direction F.

Even if two or more failures occur simultaneously, the functioning network nodes outside the area between the first and the last failure in the transmission line 1, regarded in one of both directions F or B, can remain accessible for the distribution signals DS in a similar manner.

After elimination of a failure it is not necessary, in a number of network nodes, that switches are operated again, so that in all network nodes of the network the DC functions are again carried out in the same direction. In principle, re-operation will be required only on the occurrence of a subsequent failure.

For the tapping device, two principally different embodiments are possible.

Figure 4:
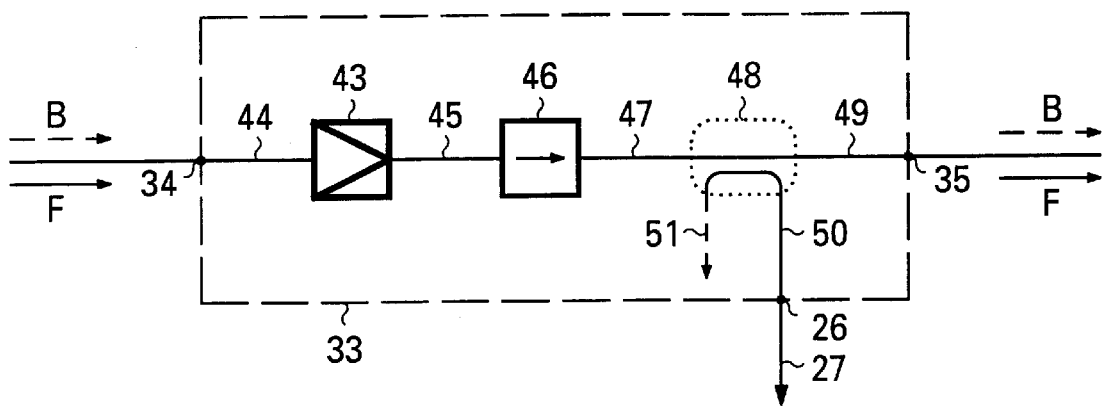
FIG. 4 shows in more detail a first variant for a part of the coupling arrangement shown in FIG. 2.

A first embodiment, in which the distribution signals in the optical domain are amplified and tapped, is shown in FIG. 4. The tapping device 33 comprises an optical amplifier 43 of which an input 44 is coupled to the input port 34, and an output 45 is coupled, via an isolator 46, to a first port 47, a first input port, of a directional coupler 48. A second port 49, a first output port, of the directional coupler is coupled to the first output port 35 of the tapping device, while a third port 50, a second output port, of the directional coupler is coupled to the second output port 26 of the tapping device. The directional coupler has yet a fourth port 51, which can be used for monitoring purposes, for example for detecting any signals which are externally presented to the first output port 35 of the tapping device.

Figure 5:
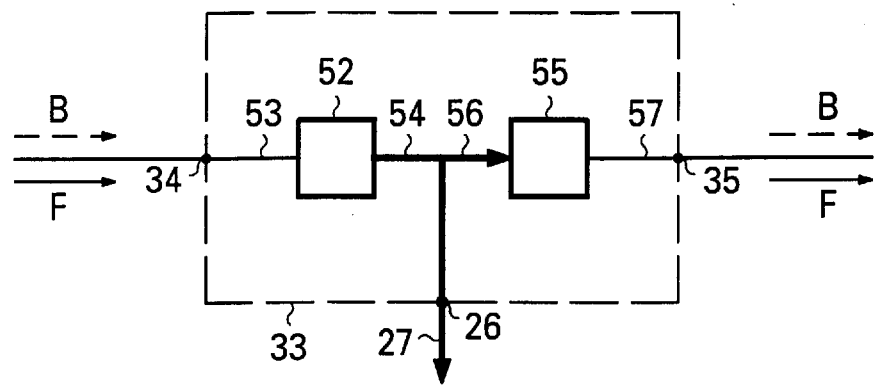
FIG. 5 shows in more detail a second variant for a part of the coupling arrangement shown in FIG. 2.

A second embodiment, in which the optical distribution signals, after an opto-electrical conversion, are amplified and tapped in the electrical domain, is shown in FIG. 5. The tapping device 33 comprises an optical receiver 52, which is provided with an optical input port 53 and an electrical output port 54, and an optical transmitter 55, which is provided with an electrical input port 56 and an optical output port 57. The input port 53 of the receiver 52 is coupled to the input port 34 of the tapping device, and output port 54 is coupled on the one hand to the input port 56 and on the other hand to the second output port 26 of the tapping device. The output port 57 of the transmitter 55 is coupled to the first output port 35 of the tapping device.

Instead of with the aid of a dropping point 42 placed in the optical connection 39, a control signal for the switch 28 can be obtained in yet various other ways. Such as from a simple power measurement, which is carried out on the signal (FD or BD) which appears at the second output port 26 of the tapping device 33. This control signal is preferably supplied to the control line 37 of the switch 28 with a delay period which is dependent upon the place of the node concerned in the network. However, this is not further elaborated.

Figure 6:
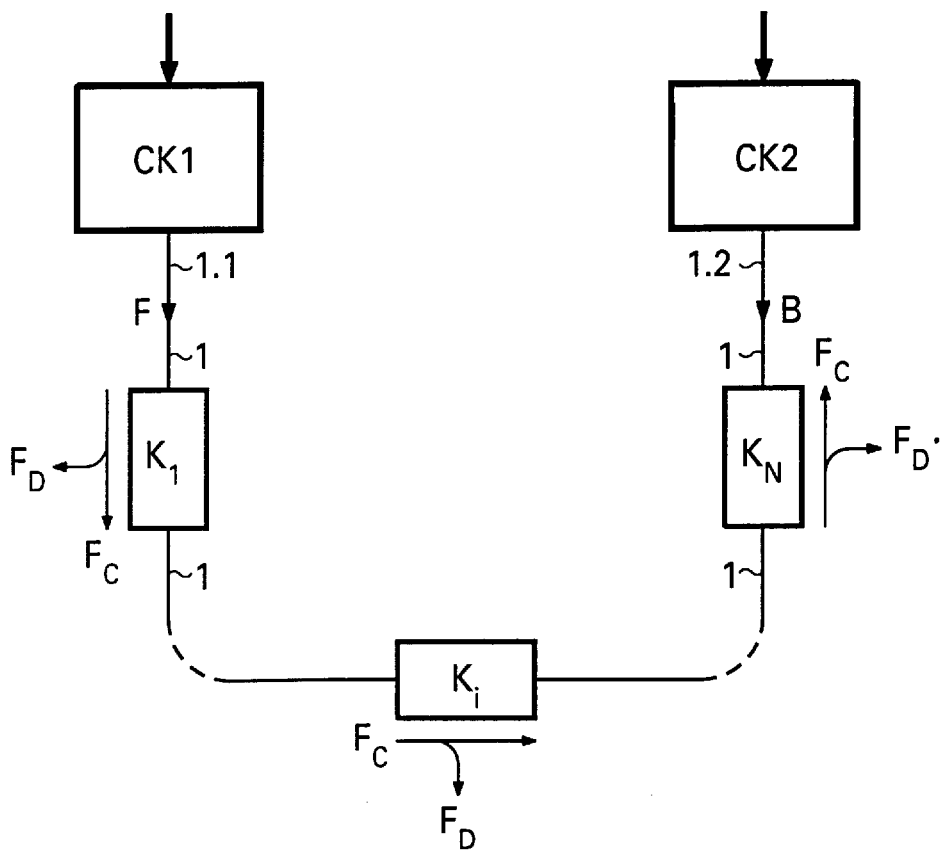
FIG. 6 diagrammatically shows a second configuration of a distributive network according to the invention.

It is not necessary that the distribution signals DS originate from one and the same central node CK. The coupling arrangement of FIG. 2 can be applied in exactly the same way in each of the network nodes of a network of network nodes connected in a row, in which dual homing is applied. Such a network is shown in FIG. 6. This network also comprises a row of N (N≧2) network nodes $K_1, \ldots, K_i, \ldots, K_N$, which are successively included in an optical transmission line 1 with ends 1.1 and 1.2. The network further comprises two central network nodes $CK_1$ and $CK_2$, which are respectively connected to the ends 1.1 and 1.2 of the transmission line 1. In such a network also, all functioning network nodes are, by self-healing shortly after the occurrence of a single failure, still or again accessible for the distribution signals.

I claim:

1. A coupling arrangement for coupling first and second ends of a transmission line which is capable of bidirectionally transmitting optical signals, said coupling arrangement comprising:

a unidirectional optical tapping device for providing a signal drop and signal continue function, said tapping device having an input, a first output, and a second output, and an optical switch arranged to switchably connect, in accordance with a signal direction, one of the first end and the second end of the transmission line to the input of the tapping device and the other of the first end and the second end of the transmission lines to the first output of the tapping device, respectively, so as to unidirectionally feed optical signals through the tapping device.

2. The coupling arrangement according to claim 1, wherein the optical switch is provided with a signal input for controlling the switch to switch between a bar-state wherein the switch is in a first position such that the first end and the second end of the transmission line are connected to the input and the first output of the tapping device, respectively, and a cross-state wherein the switch is in a second position such that the first end and the second end of the transmission line are connected to the first output and the input of the tapping device, respectively.

3. The coupling arrangement according to claim 2, wherein the tapping device includes:

an optical amplifier provided with an input and an output, and an optical power splitter provided with an input, a first output, and a second output, wherein the input of the amplifier forms the input of the tapping device, the output of the amplifier is coupled to the input of the power splitter, the first output of the power splitter forms the second output of the tapping device, and the second output of the power splitter forms the first output of the tapping device.

4. The coupling arrangement according to claim 2, wherein the tapping device includes:

an optical receiver having a signal input for receiving an optical signal and a signal output delivering a corresponding electrical signal, an optical transmitter having a signal input for receiving the electrical signal and a signal output for transmitting a corresponding optical signal, wherein the signal input of the optical receiver forms the input of the tapping device, the signal output of the optical receiver is coupled to the signal input of the optical transmitter and to the second output of the tapping device, and the signal output of the optical transmitter forms the first output of the tapping device.

5. A network comprising:

a central node having optical transmission means for transmitting distribution signals, an optical power splitter having an input coupled to the optical transmission means, a first output, and a second output, a row of N (N≧2) network nodes connected to the central node and mutually connected by means of optical connections for taking off and passing on the distribution signals, said row of network nodes including a first network node connected to the first output of the power splitter and to a following network node, a last network node connected to a preceding network node and to the second output of the power splitter, and intermediate network nodes which are each connected to respective preceding network nodes and to respective following network nodes, wherein at least one of the network nodes is provided with a coupling arrangement for coupling first and second ends of a transmission line which is capable of bidirectionally transmitting optical signals, said first end of the transmission line being connected to one of the respective preceding network node and the first output of the power splitter, and said second end of the transmission line being connected to one of the respective following network node and the second output of the power splitter, and wherein said coupling arrangement comprises: (i) a unidirectional optical tapping device for providing a signal drop and signal continue function, said tapping device having an input, a first output, and a second output, and (ii) an optical switch arranged to switchably connect, in accordance with a signal direction, one of the first end and the second end of the transmission line to the input of the tapping device and the other of the first end and the second end of the transmission lines to the first output of the tapping device, respectively, so as to unidirectionally feed optical signals through the tapping device.

6. The network according to claim 5, wherein the optical switch of the coupling arrangement is provided with a signal input for controlling the switch to switch between a bar-state wherein the switch is in a first position such that the first end and the second end of the transmission line are connected to the input and the first output of the tapping device, respectively, and a cross-state wherein the switch is in a second position such that the first end and the second end of the transmission line are connected to the first output and the input of the tapping device, respectively.

7. The network according to claim 6, wherein the tapping device of the coupling arrangement includes:

an optical amplifier provided with an input and an output, and an optical power splitter provided with an input, a first output, and a second output, wherein the input of the amplifier forms the input of the tapping device, the output of the amplifier is coupled to the input of the power splitter, the first output of the power splitter forms the second output of the tapping device, and the second output of the power splitter forms the first output of the tapping device.

8. The network according to claim 6, wherein the tapping device of the coupling arrangement includes:
- an optical receiver having a signal input for receiving an optical signal and a signal output delivering a corresponding electrical signal,
- an optical transmitter having a signal input for receiving the electrical signal and a signal output for transmitting a corresponding optical signal,
- wherein the signal input of the optical receiver forms the input of the tapping device, the signal output of the optical receiver is coupled to the signal input of the optical transmitter and to the second output of the tapping device, and the signal output of the optical transmitter forms the first output of the tapping device.

9. The network according to claim 7, wherein each of the network nodes is provided with a coupling arrangement corresponding to the coupling arrangement of the at least one network node.

10. The network according to claim 8, wherein each of the network nodes is provided with a coupling arrangement corresponding to the coupling arrangement of the at least one network node.

11. A network comprising:
- a first central node having first optical transmission means for transmitting first distribution signals,
- a second central node having second optical transmission means for transmitting second distribution signals,
- a row of N (N≧2) network nodes connected to the first and second central nodes and mutually connected by means of optical connections for taking off and passing on the first and second distribution signals, said row of network nodes including a first network node connected to the first optical transmission means of the first central node and to a following network node, a last network node connected to a preceding network node and to the second transmission means of the second central node, and intermediate network nodes which are each connected to respective preceding network nodes and to respective following network nodes,
- wherein at least one of the network nodes is provided with a coupling arrangement for coupling first and second ends of a transmission line which is capable of bidirectionally transmitting optical signals, said first end of the transmission line being connected to one of the respective preceding network node and the first optical transmission means of the first central node, and said second end of the transmission line being connected to one of the respective following network node and the second optical transmission means of the second central node, and
- wherein said coupling arrangement comprises: (i) a unidirectional optical tapping device for providing a signal drop and signal continue function, said tapping device having an input, a first output, and a second output, and (ii) an optical switch arranged to switchably connect, in accordance with a signal direction, one of the first end and the second end of the transmission line to the input of the tapping device and the other of the first end and the second end of the transmission lines to the first output of the tapping device, respectively, so as to unidirectionally feed optical signals through the tapping device.

12. The network according to claim 11, wherein the optical switch of the coupling arrangement is provided with a signal input for controlling the switch to switch between a bar-state wherein the switch is in a first position such that the first end and the second end of the transmission line are connected to the input and the first output of the tapping device, respectively, and a cross-state wherein the switch is in a second position such that the first end and the second end of the transmission line are connected to the first output and the input of the tapping device, respectively.

13. The network according to claim 12, wherein the tapping device of the coupling arrangement includes:
- an optical amplifier provided with an input and an output, and
- an optical power splitter provided with an input, a first output, and a second output,
- wherein the input of the amplifier forms the input of the tapping device, the output of the amplifier is coupled to the input of the power splitter, the first output of the power splitter forms the second output of the tapping device, and the second output of the power splitter forms the first output of the tapping device.

14. The network according to claim 12, wherein the tapping device of the coupling arrangement includes:
- an optical receiver having a signal input for receiving an optical signal and a signal output delivering a corresponding electrical signal,
- an optical transmitter having a signal input for receiving the electrical signal and a signal output for transmitting a corresponding optical signal,
- wherein the signal input of the optical receiver forms the input of the tapping device, the signal output of the optical receiver is coupled to the signal input of the optical transmitter and to the second output of the tapping device, and the signal output of the optical transmitter forms the first output of the tapping device.

15. The network according to claim 13, wherein each of the network nodes is provided with a coupling arrangement corresponding to the coupling arrangement of the at least one network node.

16. The network according to claim 14, wherein each of the network nodes is provided with a coupling arrangement corresponding to the coupling arrangement of the at least one network node.

17. A network node for switchably taking off and passing on optical signals in a first signal transport direction of a bidirectional optical transmission line and for simultaneously blocking optical signals in a second signal transport direction of the bidirectional optical transmission line, said bidirectional optical transmission line including first and second bidirectional optical connections, and said network node being provided with a coupling arrangement for coupling the first and second bidirectional optical connections, said coupling arrangement comprising:
- a unidirectional optical tapping device for providing a signal drop and signal continue function, said tapping device having an input, a first output, and a second output, and
- an optical switch arranged to switchably connect, in accordance with a signal direction, one of the first and second bidirectional optical connections to the input of the tapping device and the other of the first and second bidirectional optical connections to the first output of the tapping device, respectively, so as to unidirectionally feed optical signals through the tapping device.

18. The network node according to claim 17, wherein the optical switch of the coupling arrangement is provided with a signal input for controlling the switch to switch between a bar-state wherein the switch is in a first position such that first and second bidirectional optical connections are connected to the input and the first output of the tapping device, respectively, and a cross-state wherein the switch is in a second position such that the first and second bidirectional optical connections are connected to the first output and the input of the tapping device, respectively.

19. The network node according to claim 18, wherein the tapping device of the coupling arrangement includes:

an optical amplifier provided with an input and an output, and an optical power splitter provided with an input, a first output, and a second output, wherein the input of the amplifier forms the input of the tapping device, the output of the amplifier is coupled to the input of the power splitter, the first output of the power splitter forms the second output of the tapping device, and the second output of the power splitter forms the first output of the tapping device.

20. The network node according to claim 18, wherein the tapping device of the coupling arrangement includes:

an optical receiver having a signal input for receiving an optical signal and a signal output delivering a corresponding electrical signal, an optical transmitter having a signal input for receiving the electrical signal and a signal output for transmitting a corresponding optical signal, wherein the signal input of the optical receiver forms the input of the tapping device, the signal output of the optical receiver is coupled to the signal input of the optical transmitter and to the second output of the tapping device, and the signal output of the optical transmitter forms the first output of the tapping device.

* * * * *